(12) United States Patent
Tatz

(10) Patent No.: US 6,942,085 B1
(45) Date of Patent: Sep. 13, 2005

(54) HEIGHT ADJUSTABLE MINI-SUPPORT ROLLER FOR SUPPORTING A PIECE OF MATERIAL

(76) Inventor: Eliezer Tatz, 201-180 Dr., No. 209, North Miami Beach, FL (US) 33160

( * ) Notice: Subject to any disclaimer, the term of this patent is extended or adjusted under 35 U.S.C. 154(b) by 544 days.

(21) Appl. No.: 10/068,729

(22) Filed: Feb. 6, 2002

(51) Int. Cl.[7] .............................................. B65G 21/08
(52) U.S. Cl. .................. 193/35 R; 198/860.1; 144/287
(58) Field of Search .......................... 193/35 R, 35 SS; 198/860.1; 144/287; 269/289 MR

(56) References Cited

U.S. PATENT DOCUMENTS

| | | | |
|---|---|---|---|
| 3,901,378 A | * | 8/1975 | Rolland ..................... 198/782 |
| 4,753,279 A | * | 6/1988 | Harris ........................ 144/287 |
| 5,337,875 A | * | 8/1994 | Lee ........................... 193/35 R |
| 5,435,411 A | * | 7/1995 | Borgatti ............... 269/289 MR |
| 5,657,857 A | * | 8/1997 | Neilson et al. .......... 198/860.1 |
| 6,179,024 B1 | * | 1/2001 | Yang .......................... 144/287 |
| 6,179,116 B1 | * | 1/2001 | Noniewicz et al. ...... 198/861.1 |
| 6,193,044 B1 | * | 2/2001 | Larsen ..................... 193/35 R |
| 6,575,213 B1 | * | 6/2003 | Houk ......................... 144/287 |

* cited by examiner

*Primary Examiner*—James R. Bidwell
(74) *Attorney, Agent, or Firm*—Christopher & Weisberg, P.A.

(57) ABSTRACT

The present invention is a durable, lightweight, compact, portable and adjustable roller support apparatus for supporting an end of a piece of material while maintaining the end at a height substantially equivalent to the worked-upon opposing end of the material in order to facilitate sawing or cutting of the material, when the saw or drill is placed on the floor. While sawing or drilling one end of an elongated piece of material, such as plywood, it is necessary to adjustably raise the opposing end in order to facilitate cutting. The apparatus comprises a roller, upon which the non-worked end of the material is to be supported, a supporting and adjusting mechanism allowing the non-worked end of the material to be raised and lower to accommodate different saw sizes, and a durable, compact stand portion which is placed on the floor, Preferably, a guide member aligns one side of the piece of material in order to facilitate cutting, and the bottom surface of the stand portion is coated with a rubberized material in order to prevent marring of the floor surface upon which the apparatus is placed.

13 Claims, 6 Drawing Sheets

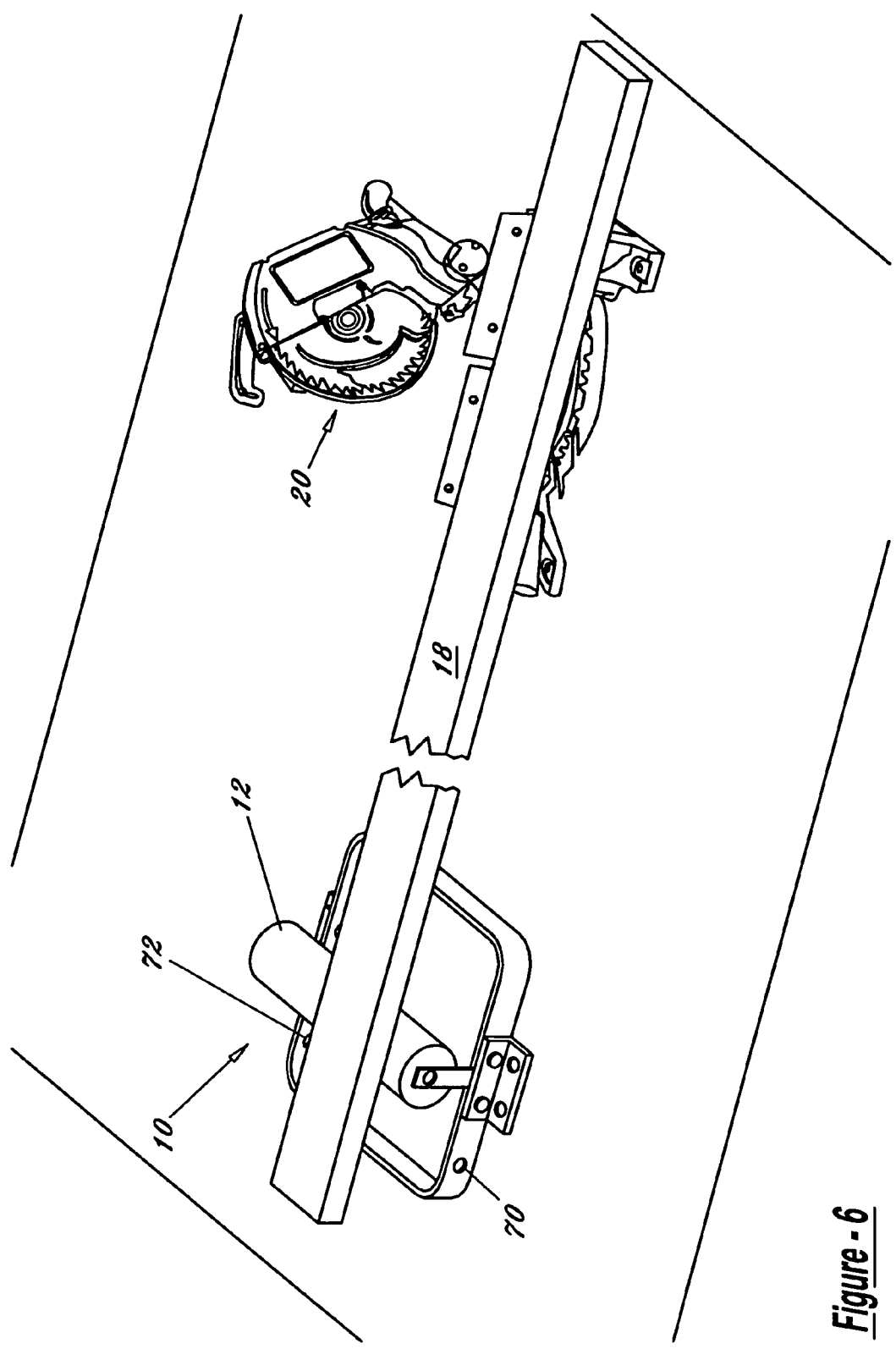

HEIGHT ADJUSTABLE MINI-SUPPORT ROLLER FOR SUPPORTING A PIECE OF MATERIAL

BACKGROUND OF THE INVENTION

1. Field of the Invention

This invention relates generally to a durable, lightweight, compact, portable support stand for one end of a piece of material, the other end of which is being worked on with a machine such as an electrical miter saw or a portable thickness planer. Specifically, the invention provides a roller support, the height of which may be adjusted relative to the miter saw or planer stand so that one end of a piece of material, such as a piece of wood, plastic, aluminum siding or other material can be positioned at an optimum height in order to match the height of the opposing end of material supported by the miter saw or planer.

2. Description of Related Art

In working with long pieces of material, such as wood, molding, aluminum siding, or plastic channels, it is important that one end of the material maintains substantially the same height as the opposing end of material being supported by the machine working the piece, such as the stand of a miter saw or planer. Typically, a miter saw supports one end of a piece of material several inches off the ground. The height of miter saw stands typically range from 2¼ inches to about 4¾ inches. If the unworked end of a piece of material were resting on the ground, a worker would find it very awkward to work on the raised end. The piece of material could be, for example, a 2×4, or 2×8 piece of wood, molding or siding. If the orientation is off, i.e. the worked-on end is higher than the opposite end, the cut into the piece, whether by a miter saw or a planer, can be off-center or otherwise out of kilter. Therefore, a support to maintain the unworked end of the piece of material (wood, plastic, metal, etc.) at substantially the same height as the end of the material where the work is taking place is needed. This support will keep the piece at an optimum height for work with the machine.

Moreover, sometimes the work cannot be accomplished in a typical workshop. Often, a carpenter, plumber or metal worker travels away from the convenience of his home office workbench and works on a piece of wood, plastic or metal at a job site. At such times, a portable saw or planer is used. Often, the saw or planer must be placed on the floor of the job site since a workbench is generally not available. Sometimes the job site is a person's home or office, where counter space is limited or non-existent, so the cutting must take place on the floor. The floor may have decorative carpeting, expensive wood or other flooring material that may be marred by the piece if it were dragged across the flooring without a protective covering.

Prior art support stands generally include a telescopic stand that allows the worked end of the material to rest on a workbench while raising the other, unworked end several feet to substantially the same height as the worked end. This type of support is too large and cumbersome to transport and completely inapplicable at job sites where there is no workbench or table to support the saw or planer, which must instead rest on the floor.

Rather, a support stand for a job site application should preferably be compact, lightweight, and sturdy, so the person using it may bring it to the job site without being concerned that the support might break or that the support requires major assembly, as well as adjustable to accommodate different sized planers or saws. Furthermore, once adjusted, it may also be desirable that the support be attachable to a worktable, should one be available, since any unanticipated movement of the piece of material during sawing may result in undesired cuts. In addition, retailers would find it convenient to be able to stack multiple support stands one on top of the other without taking up excess space. Moreover, even a properly positioned support stand may still not do a proper job if it does not provide a guiding member, which guides and aligns the piece of material with the cutting tool.

Prior art support devices are neither compact nor rigid. U.S. Pat. No. 6,179,116 to Noniewicz et al. teaches a collapsible bearing stand with several pieces necessary to adjust height and orientation, and which is impracticable for use with a cutting machine on a floor. U.S. Pat. No. 4,715,488 to Hewitt et al. teaches a collapsible conveyor with pivoting legs, which is cumbersome, heavy and also of no use when a saw is on a floor.

The prior art inventions are not compatible with portable saws or planers placed on a floor. Also, the prior art devices are flimsy and unwieldy and cannot be used both on a floor and be adapted for attachment to a worktable. The prior art supports may mar expensive floor surfaces or carpets. Also, prior art devices do not include removable guide members, and are not stackable.

Accordingly, what is needed in the art is a support stand that will keep the unworked end of an elongated piece of material at substantially the same height and in proper alignment with the worked-upon end of the material when the piece is supported by a saw or planer resting on the floor. It is also desirable to have an adjustable support stand to accommodate various miter saws or planers of different sizes and heights. Also, there is a need for such a support to be attachable to a worktable. The need also exists for the support to be sturdy as well as compact and lightweight. Moreover, a need exists for a support stand, which may be easily stacked upon similar stands. In addition, a need exists for a stackable support, which has a removable guide member.

It is, therefore, to the effective resolution of the aforementioned problems and shortcomings of the prior art that the present invention is directed.

BRIEF SUMMARY OF THE INVENTION

The present invention provides a novel and unique durable, sturdy, lightweight, compact, and portable support stand for a piece of material to be worked with a machine such as a miter saw or a thickness planer. The present invention will support a work piece in proper alignment and height when the worked-on end of the material is supported by the machine, which rests on the floor. Also, the support stand can be attachable to a worktable. Moreover, the present invention is stackable, may include a removable guide member and can be coated with a rubberized protective layer to prevent the marring of the floor, carpet, or other surface upon which the support stand rests.

The present invention is a lightweight, compact, adjustable and portable support stand for a piece of material to be worked with a machine, comprising a compact stand portion, a roller adapted to support a first, non-worked end of an elongated piece of material, the roller in longitudinal complementary attachment to the compact stand portion, and means for supporting the roller relative to the stand portion, the supporting means in cooperative attachment to the stand portion, whereby upon the first end of material being placed upon and supported by the roller, a second end of the piece of material may be worked on by the machine, the first end being situated at substantially the same height as the second end.

Preferably, the stand portion includes first and second diametrically opposed indented sections, wherein the means for supporting the roller relative to the stand portion comprises a first roller support bar having a top end and a bottom end, a second roller support bar having a top end and a bottom end, whereby the roller support bars include roller receiving orifices adapted to receive and support an end of the roller, and the bottom ends of the roller support bars are received within their respective indented sections of the stand portion, a first bracket and a second bracket, wherein the first bracket secures the first roller support bar to the first indented section and the second bracket secures the second roller support bar to the second indented section, and means for securing the roller support bars between the brackets and the indented sections of the stand portion. The roller may include one or more internal springs to facilitate the removal and insertion of the ends of the roller within the roller receiving orifices.

In one embodiment of the invention, a plurality of rollers may be removeably affixed to the stand portion via additional roller support bars in the manner described above. This embodiment would be used if additional support to the unworked end of the piece of material is desired.

The stand may be adapted to support a non-worked on end of material at substantially the same height as the stand of a miter saw or planer which supports the opposing end of material. Alternately, multiple stands can be placed so as to support various portions of a lengthy piece of material. This further facilitates the cutting of the material by providing supporting alignment not only at the non-worked end of the material but at various locations along the material's length.

To adjust the height of the roller, the height of the saw or planer stand is first determined. The first and second support bars can then be cut (via any standard metal-cutting devices) to the same height as the saw/planer support stand. Alternatively, the support stand could come equipped with various sizes of support bars to match varying miter saw stand heights. In either case, once the proper support bar height has been selected, the support bars are secured within their respective indented sections, and each end of the roller secured to a support bar.

The means for securing the roller support bars are preferably comprised of a nut and bolt combination situated on either side of the bottom end of each roller support bar.

The apparatus may also comprise means located on the stand portion for attaching the stand portion to a table or workbench.

The support stand may further comprise L-shaped brackets, each including a vertical portion joined along its bottom end to a horizontal portion, the vertical portion of each L-shaped bracket forming the means for securing the roller support bars, and the horizontal portion of each L-shaped bracket forming the table attaching means for attaching the stand portion to a table or workbench. The roller support bar securing means and the table attaching means are also preferably comprised of complementary nut and bolt attachments.

The support stand may be formed of any number of shapes including a stand that is substantially O-shaped, substantially square or substantially rectangular. The bottom surface of the stand portion is preferably comprised of a non-marring material such as rubberized paint to prevent the floor upon which the apparatus is placed from being damaged.

In one embodiment of the present invention, the support stand further comprises a guide member removably affixed to a side of the stand portion, the guide member for providing aligning support for one side of the piece of material. The guide member may include a cut-out portion to receive an end of the roller.

When the apparatus is not in use, means are provided for directly attaching the roller longitudinally to the stand portion in a lowered, off-center orientation to allow for multiple support stands to be stacked upon each other.

It is therefore an object of the present invention to provide an adjustable support stand for supporting one end of an elongated piece of material at a height substantially the same as the height of the opposing end of material when supported by a miter saw or planer platform resting on the floor.

It is another object of the present invention to provide an adjustable support stand which allows for the easy raising or lowering of the un-worked end of the material in order to accommodate different size saws and planers.

It is still another object of the present invention to provide a support stand having a cylindrical roller in order to facilitate the sliding of the material along the support stand.

It is yet another object of the present invention to include a guide member to assist in aligning the piece of material upon the support stand.

It is another object of the present invention to provide a support stand with a coated protective layer along its bottom surface to prevent damage to the surface upon which the support stand is placed.

It is still yet another object of the present invention to provide a support stand which, when not in use may be stacked upon other support stands in a compact, orderly, fashion.

It is another object of the present invention to provide means for securing the support stand to a workbench or table should one be available.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE SEVERAL VIEWS OF THE DRAWINGS

For a fuller understanding of the nature and objects of the invention, reference should be made to the following detailed description, taken in connection with the accompanying drawings, in which:

FIG. 6 is a perspective view of the preferred embodiment of the invention in use with a miter saw.

DETAILED DESCRIPTION OF THE INVENTION

Figure 3:
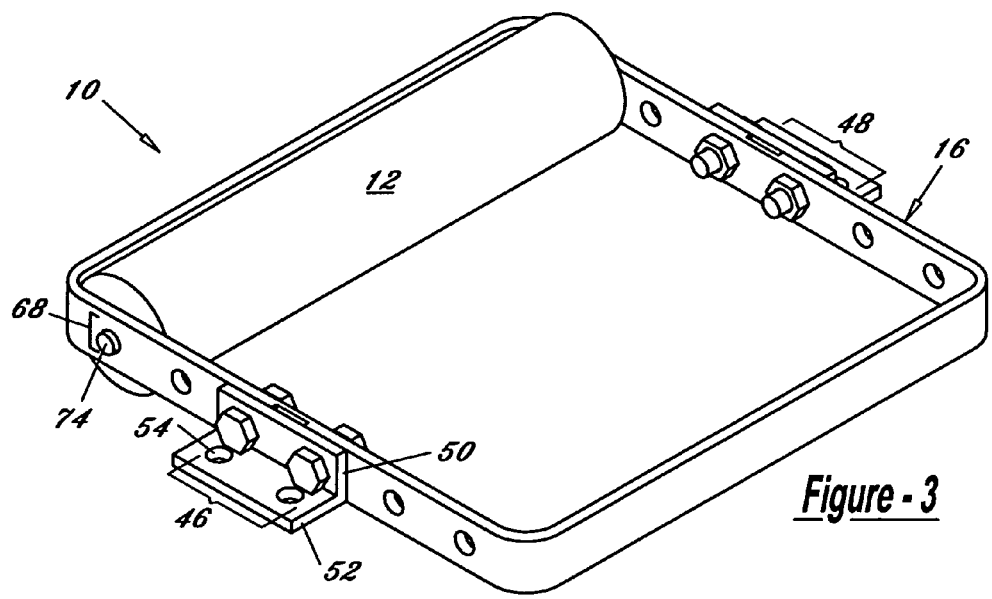
FIG. 3 is a perspective view of the present invention showing the roller attached directly to the stand portion in a stackable configuration.
Figure 1:
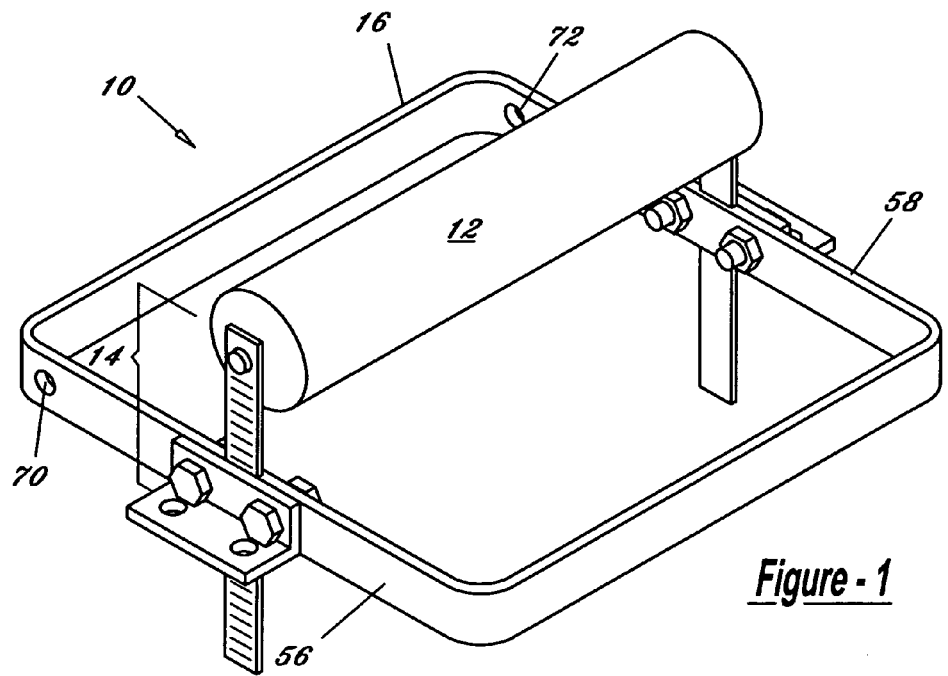
FIG. 1 is a perspective view of the preferred embodiment of the invention.
Figure 2:
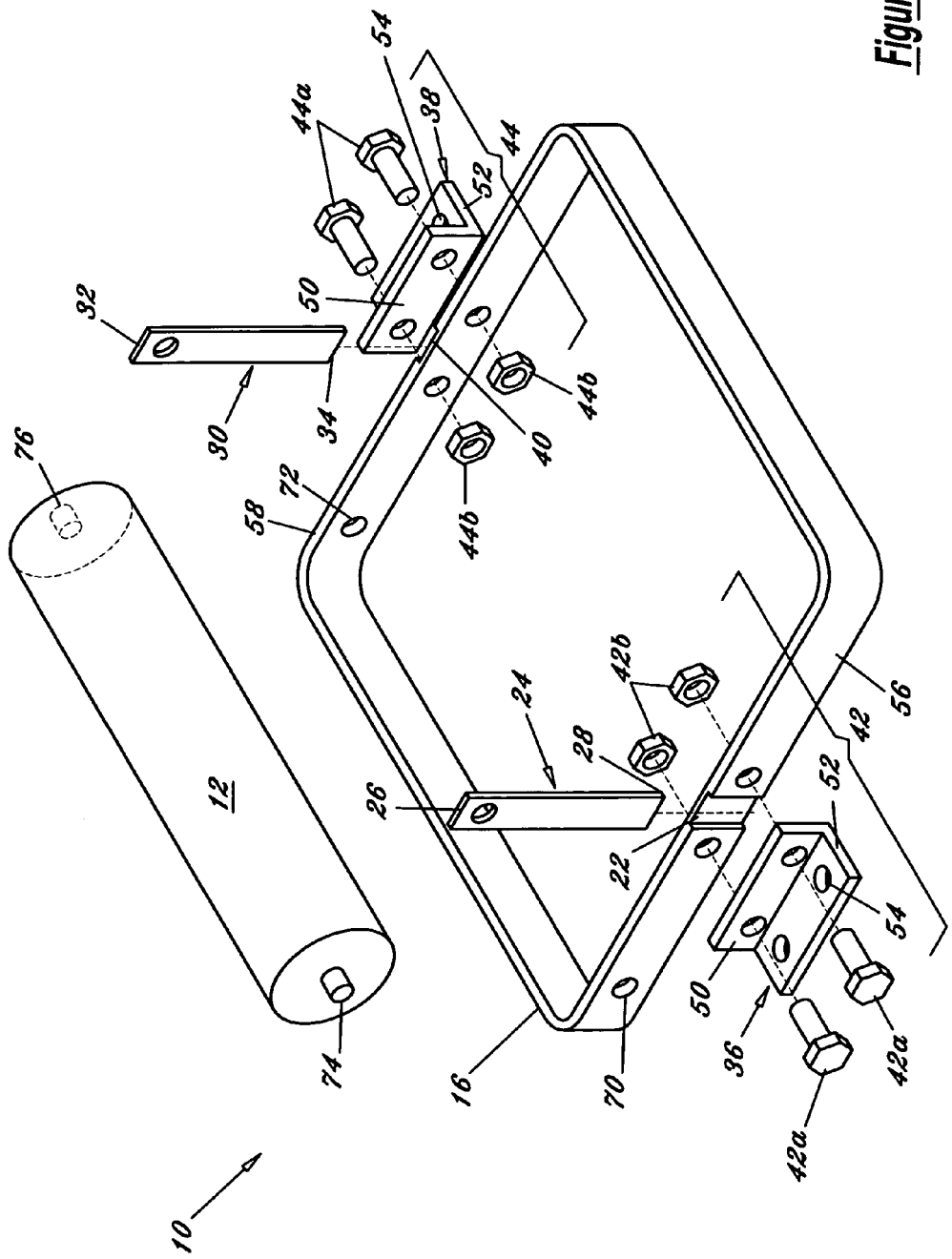
FIG. 2 is an exploded perspective view of the preferred embodiment of the invention.
Figure 5:
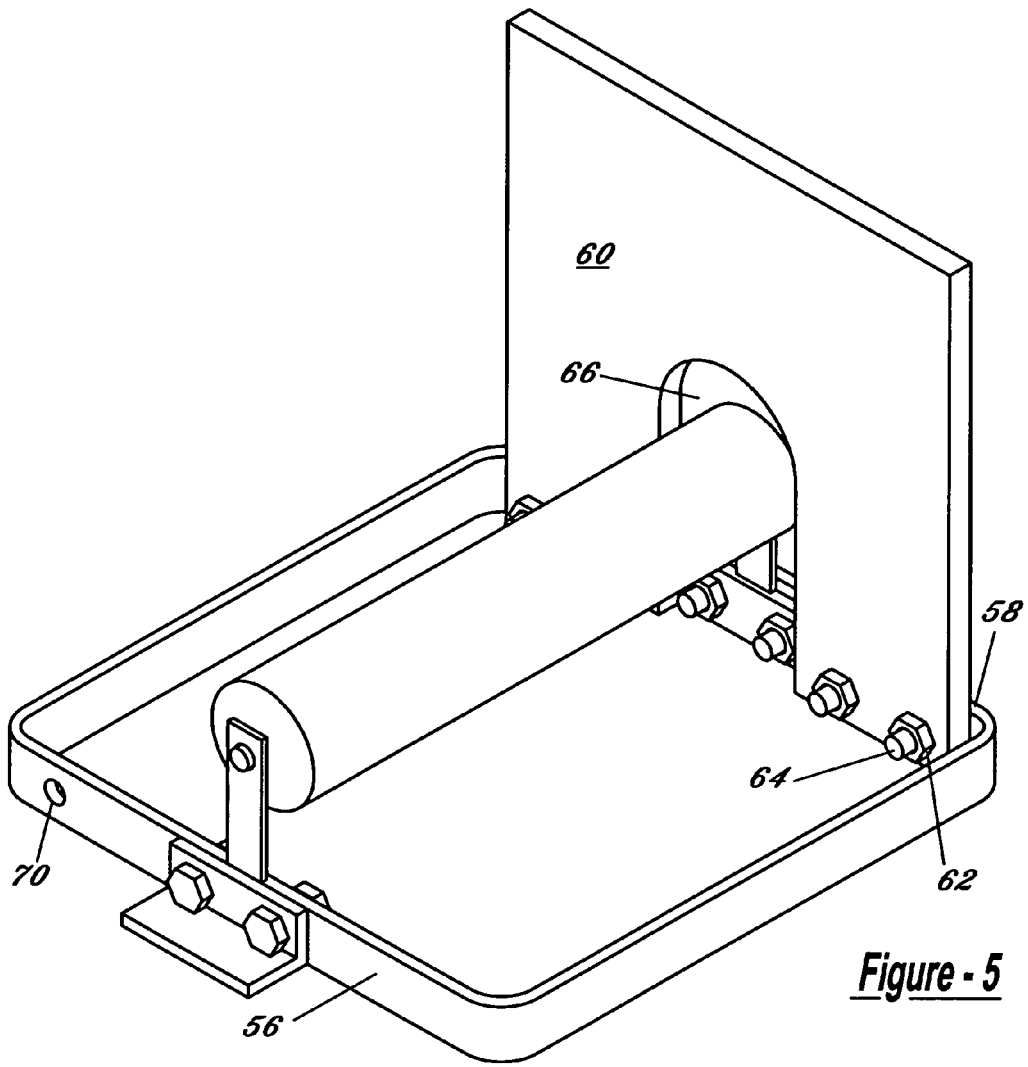
FIG. 5 is a perspective view of an alternate embodiment of the invention.
Figure 4:
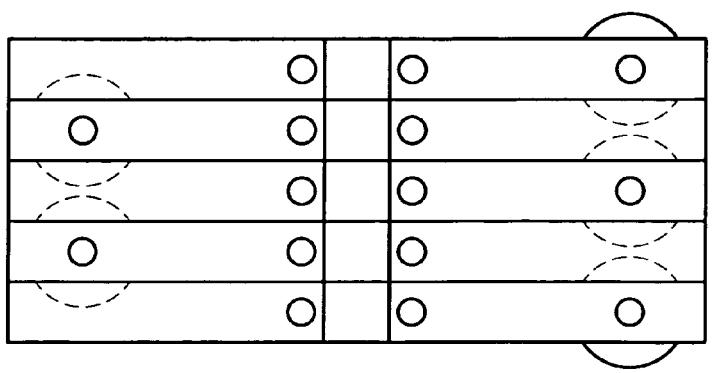
FIG. 4 is a side view of a stack of several examples of the invention.
Figure 7:
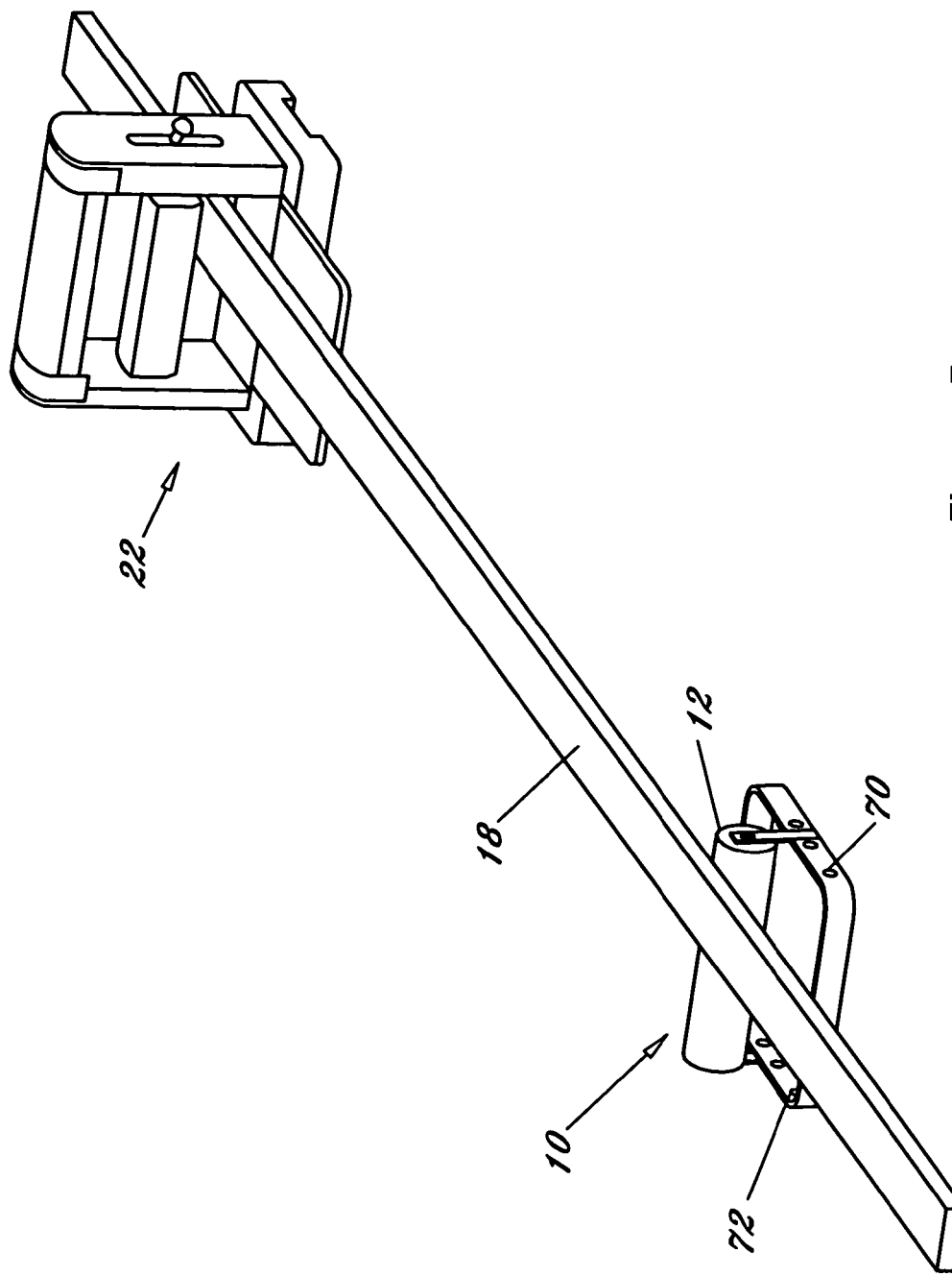
FIG. 7 is a perspective view of the preferred embodiment of the invention in use with a planer.
Figure 8:
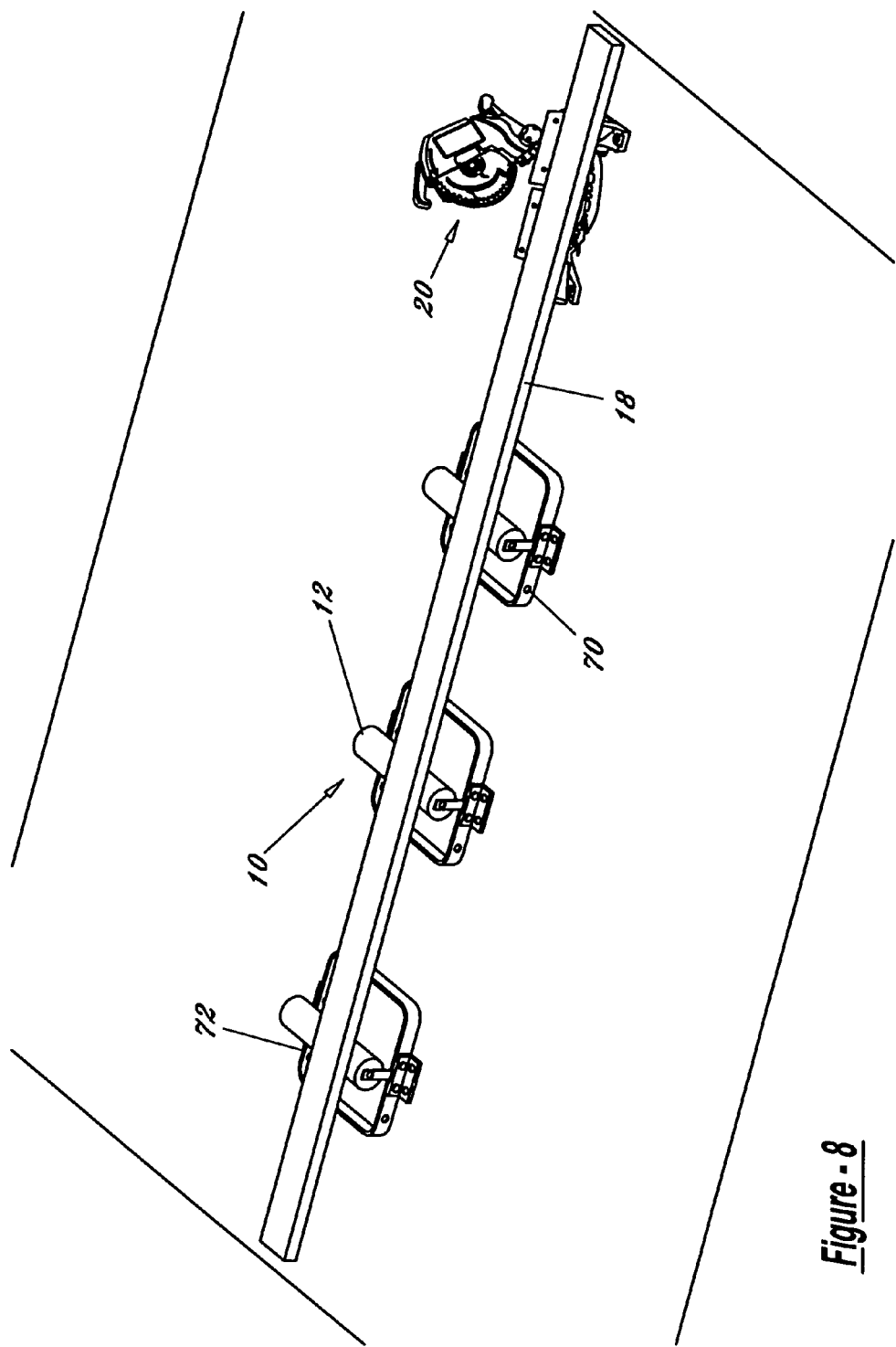
FIG. 8 is a perspective view of an alternative embodiment of the invention wherein multiple support stands are used to support a length of material thereby creating a portable support system.

The present invention is a durable, lightweight, compact, portable support stand, identified generally as 10, for an elongated piece of material, such as wood, aluminum siding, or plastic, to be worked with a miter saw, planer or other machine. FIGS. 1 and 2 illustrate the preferred embodiment of the present invention. FIG. 3 shows the support stand in a stackable configuration. FIG. 4 shows a plurality of stacked support stands not in use. FIG. 5 illustrates an alternate version of the support stand with a guide member. FIG. 6 illustrates support stand 10 used in conjunction with a miter saw resting on the floor. FIG. 7 illustrates the support stand of the present invention, being used in conjunction with a planer resting on the floor. FIG. 8 illustrates multiple support stands combined to comprise a portable support system.

Support stand 10 is especially suited for a portable miter saw or planer. Although the term "saw" is used throughout the claims and specification, the term is meant to apply to any machine for working on a piece, including machines for drilling, sanding, or other machining. Support stand 10 can be comprised of metal, plastic, wood or other suitable sturdy material. Further, support stand 10 could be comprised of a combination of different materials. Preferably, support stand 10 is comprised of rubber coated metal around its periphery, metal support bars, and a metal roller.

Support stand 10 includes a roller 12. Roller 12 allows the piece of elongated material to be easily moved in a forward and backward direction and manipulated by the user in order to facilitate the work being done on the opposing end of the material.

As shown in FIGS. 1 and 2, roller 12 is preferably a single elongated cylinder, rotatable about is longitudinal axis. Roller 12 is preferably comprised of metal having a smooth outer surface and including a substantially hollow interior. Within roller 12 is an inner cylindrical tube with protruding knobs 74 and 76. Roller 12 rotates freely around this inner tube, while the inner tube remains fixed and supported via knobs 74 and 76 on bars 24 and 30. However, roller 12 may also be replaced by a plurality of cylinders in parallel, each supporting a portion of the weight of the piece of material to be worked. As shown in FIG. 1, roller 12 is in longitudinal complementary attachment to a roller support mechanism 14, which supports and can adjust the roller height relative to a durable, compact stand portion 16. Support mechanism 14 is attached to stand portion 16. Stand portion 16 has a near side 56 and a far side 58.

The entire support stand 10 is adapted to support, upon roller 12, the unworked end of a piece of material 18 at an optimal height, i.e. substantially the same height as the opposing (worked on) end of material 18, which is being supported by a saw 20, as shown in FIG. 6, or a planer 22, as shown in FIG. 7.

It is preferred that stand portion 16 is generally square and made of a sturdy material, such as steel, aluminum, or plastic. It is also preferred that the bottom surface of stand portion 16 is a non-marring surface, either as an intrinsic characteristic of stand portion 16 or as a coating along the bottom surface. Preferably, a rubberized paint is applied to the bottom surface of stand portion 16.

As shown in FIG. 2, it is preferred that stand portion 16 have two indented sections 22 and 40, one each on the outside of the diametrically opposing ends of the stand portion 16. As shown, it is preferred that a first indented section 22 is on the near longitudinal end 56 and a second indented section 40 is on the far longitudinal end 58. Also, in the preferred embodiment, roller support mechanism 14 for supporting and adjusting roller height relative to stand portion 16 is comprised of a first (near) bar 24 with a top end 26 and a bottom end 28, and a second (far) bar 30 with a top end 32 and a bottom end 34. The top end 26 of near bar 24 and the top end 32 of far bar 30 are in cooperative contact with roller 12 to allow the roller to move freely. This is accomplished by the insertion of knobs 74 and 76 into the apertures near the top of each bar, as shown in FIG. 2. The bottom end 28 of near bar 24 and the bottom end 34 of far bar 30 are in complementary contact with the indented sections 22 and 40 of stand portion 16. It is preferred that the bars be made of steel, aluminum or other sturdy material.

FIG. 1 illustrates the support stand 10 of the present invention prior to use. Bar 24 extends below bracket 36. Prior to use, bars 24 and 30 are pre-cut to match the height of the saw stand. Once cut, bars 24 and 30 are inserted and secured within stand portion 16 such that the bottoms portions 28 and 34 of each support bar 26 and 32 are substantially flush with the bottom edge of stand portion 16. The support stand may now be placed on the floor and be ready for use. In yet another embodiment, the pair of support bars 24 and 30 may be of varying heights so that each corresponding pair can be used with saws/planers of different heights. The extra support bars, when not in use, can be affixed to the sides of stand portion 16 via tape or other adhering means. In this fashion, support stand 10 may be used with virtually any sized machine.

When inserted within bars 24 and 30 of support stand 10, roller 12 is at the optimum height for supporting the elongated piece of material 18 on a typical miter-cut saw stand, typically several inches from the ground. Alternatively, support bars 24 and 30 may be permanently welded to stand portion 16 thereby becoming an integral part of support stand 10.

Preferably, support stand 10 has a near bracket 36 and a far bracket 38. Near bracket 38 couples near bar 24 to the first indented section 22 and far bracket 30 couples far bar 30 to the second indented section 40. In addition, support stand 10 has securing means 42 and 44 for securing bars 24 and 30 between the respective indented sections 22 and 40 and brackets 30 and 38. Securing means 42 and 44 comprise bolts 42a and 44a, and corresponding nuts 42b and 44b, where the securing means 42 and 44 are located on either side of the bottom end 28 and 34 of each bar 24 and 30. Other methods for securing bars 24 and 30 may be used that are well known in the art, such as rivets or clamps. Moreover, other common methods of supporting and adjusting the roller height may be used, such as telescoping, interlocking sections, ratchet systems or the like.

It is also preferred that support stand 10 has a means located on stand portion 16 for attaching stand portion 16 to a table or workbench (not shown). Preferably, near bracket 36 and far bracket 38 are L-shaped, with each having a vertical top portion 50 and a horizontal bottom portion 52. The bottom end 52 includes holes 54 so that stand portion 16 may be bolted, screwed or otherwise attached to a table or workbench. Therefore, support stand 10 utilizes table attachment mechanisms 46 and 48, which are comprised of the bottom portions 52, of L-shaped brackets 36 and 38, and a roller support mechanism 14, comprised, in part, of the top portion 50 of L-shaped brackets 36 and 38. Thus, the same L-shaped brackets 36 and 38 are employed to accomplish two tasks: namely, securing support stand 10 to a table (should this be necessary) and supporting and adjusting roller 12. This feature provides novel compactness and convenience in assembly and savings of material. It is within the spirit of the invention, however, to employ other methods of affixing support stand 10 to a table or workbench, which are common in the art such as by using a plurality of spaced apart brackets separate from the table attachment mechanism 46 and 48 for attaching stand portion 16 to the flat surface of a table or workbench. It may also be preferable that the bottom surface of attachment mechanism 46 and 48 comprise or incorporate a non-marring surface.

In another embodiment of the present invention shown in FIG. 5, support stand 10 includes a rigid guide member 60 attached at its lower end to the far side 58 of stand portion 16 and extending upwards therefrom. The purpose of guide member 60 is to assist the user in aligning the piece of material 18 along roller 12 so that the opposing end of the material may be worked upon easily. As shown, guide member 60 is attached to the inside surface of far side 58 by nuts 64 and bolts 66. In an alternate embodiment, guide member 60 can be attached to the outside surface of far side 58. However, other attachment means, both releasable and permanent are contemplated, such as clamps, adhesives or rivets. Preferably, guide member 60 includes an interior arch-shaped cut-out section 66 so that roller 12 is capable of rolling freely therein. Other equivalent shapes for guide member, such as an L-shape, may also be utilized. Further, cut out section 66 may be of virtually any shape provided it can receive an end of roller 12 without hindering its rolling capability.

In another embodiment shown in FIG. 3, when the support stand is not in use, roller 12 may be disengaged from support bars 24 and 30 and directly attached to stand portion 12 in a lowered, off-center orientation, via one of the holes 70 situated along near side 56 and far side 58. This orientation is used when it is desirable to work on material 18 much lower to the floor (perhaps without the use of a miter saw, but using a hand saw instead), or when support stand 10 is not in use and is to be stacked. The preferred means 68 of attaching roller 12 in this off-center orientation is via a pair of holes 70 and 72 in stand 16 and corresponding knobs 74 and 76 on the ends of roller 12. Preferably, knobs 74 and 76 are each connected to a tension spring (not shown) within roller 12, so that roller 12 can be inserted and extracted from holes 70 and 72 and/or the holes within roller support bars 24 and 30 easily my merely depressing knobs 74 and 76, thereby compressing the spring. Other means known in the art may also be utilized, such as having the knobs an integral part of stand 16 and having corresponding indentations in the ends of roller 12.

By attaching roller 12 directly to stand portion 16 and removing bars 24 and 30 from stand portion 16, many support stands 10 can be stacked on top of each other without hindrance, as shown in FIG. 4. Furthermore, support stand 10 is extremely portable in this configuration. In the previously described embodiment shown in FIG. 5, support stand 10 also includes guide member 60. When guide member 60 is also removed, support stand 10 is compact, portable and stackable as shown in FIG. 4.

FIG. 8 illustrates the use of multiple support stands 10 to support a lengthy piece of material. Used in this fashion, the present invention comprises a portable support system capable of supporting and aligning a lengthy piece of material at substantially the same height as the worked-on end of material supported by the miter saw or planer stand.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

What is claimed is:

1. A lightweight, compact, adjustable and portable support stand for supporting an end of a piece of material to be worked on by a machine comprising:

a compact stand portion;

a roller adapted to support a first end of an elongated piece of material, said roller in longitudinal complementary attachment to said compact stand portion; and means for supporting said roller relative to the stand portion, said supporting means in cooperative attachment to the stand portion, whereby upon said first end of said piece of material being placed upon and supported by said roller, a second end of said piece of material may be worked on by said machine, said first end being raised to substantially the same height as said second end, the stand portion including first and second diametrically opposed indented sections, wherein the means for supporting said roller relative to the stand portion comprises:

a first roller support bar having a top end and a bottom end;

a second roller support bar having a top end and a bottom end, whereby said roller support bars include one or more roller receiving orifices adapted to receive and support an end of said roller, and the bottom ends of said roller support bars are received within their respective indented sections of the stand portion;

a first bracket and a second bracket, wherein the first bracket secures the first roller support bar to the first indented section and the second bracket secures the second roller support bar to the second indented section; and means for securing the roller support bars between the brackets and the indented sections of the stand portion.

2. The support stand of claim 1 wherein said first and second roller support bars may be removed and replaced by roller support bars of different heights thereby adjusting the height of said roller and said piece of material supported thereon.

3. The support stand of claim 1 wherein said first and second roller support bars may be cut to a predetermined height to substantially match the height of said second end of said piece of material.

4. The support of claim 1, wherein the means for securing the roller support bars comprises a nut and bolt combination on either side of the bottom end of each bar.

5. The support of claim 1, further comprising means located on the stand portion for attaching the stand portion to a table or workbench.

6. The support stand of claim 5 further comprising L-shaped brackets each including a vertical portion joined along its bottom end to a horizontal portion, said vertical portion of each L-shaped bracket forming said means for securing said roller support bars, and said horizontal portion of each L-shaped bracket forming said table attaching means for attaching said stand portion to a table or workbench.

7. The support stand of claim 6 wherein said roller support bar securing means and said table attaching means further comprise a complementary nut and bolt attachment.

8. The support stand of claim 1, wherein the bottom surface of the stand portion comprises a non-marring material.

9. The support stand of claim 8, wherein the non-marring material is a rubberized paint.

10. The support stand of claim 1, further comprising a guide member removably affixed to a side of the stand portion, said guide member for providing aligning support for said piece of material.

11. The support stand of claim 10, wherein the guide member includes a cut-out portion to receive an end of said roller.

12. The support stand of claim 1, wherein the stand portion further comprises means for directly attaching the roller longitudinally to the stand portion in a lowered, off-center orientation to allow for multiple support stands to be stacked upon each other.

13. The support stand of claim 1 wherein said roller further comprises one or more internal springs to facilitate removal and insertion of the ends of said roller within said roller receiving orifices.

* * * * *